United States Patent [19]
Liedtke

[11] Patent Number: 6,009,503
[45] Date of Patent: *Dec. 28, 1999

[54] CACHE MEMORY INDEXING USING VIRTUAL, PRIMARY AND SECONDARY COLOR INDEXES

[75] Inventor: Jochen Liedtke, Sankt Augustin, Germany

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/732,352

[22] PCT Filed: Apr. 19, 1995

[86] PCT No.: PCT/EP95/01471

§ 371 Date: Oct. 29, 1996

§ 102(e) Date: Oct. 29, 1996

[87] PCT Pub. No.: WO95/29445

PCT Pub. Date: Nov. 2, 1995

[30] Foreign Application Priority Data

Apr. 22, 1994 [DE] Germany ............................. 44 14 116
May 11, 1994 [DE] Germany ............................. 44 16 562
Feb. 10, 1995 [DE] Germany ............................ 195 04 483

[51] Int. Cl.$^6$ .................................................. G06F 12/00
[52] U.S. Cl. ......................... 711/203; 711/200; 711/202; 711/220
[58] Field of Search .................................... 711/3, 6, 118, 711/100, 200, 202, 203, 206, 216, 220, 221, 1, 5, 108, 117, 147, 210

[56] References Cited

U.S. PATENT DOCUMENTS

| 5,226,133 | 7/1993 | Taylor et al. | 395/400 |
| 5,752,069 | 5/1998 | Roberts et al. | 711/204 |
| 5,761,726 | 6/1995 | Guttag et al. | 711/147 |

FOREIGN PATENT DOCUMENTS

WO 88/09014  11/1988  WIPO .

OTHER PUBLICATIONS

Patterson and Hennessy, "Computer Architecture A Quantitative Approach", pp. 432–448, Dec. 1990.

Primary Examiner—Eddie P. Chan
Assistant Examiner—Kimberly McLean
Attorney, Agent, or Firm—Akin, Gump, Strauss, Hauer & Feld, LLP

[57] ABSTRACT

The memory device comprises a cache memory indexed by the cache index and group information of the virtual address. The physical address translated from the virtual address contains primary and secondary group information. If the tag of the cache entry addressed according to the above standard by indexing of the cache memory corresponds to the physical address, indexing is carried out again using the second group information associated with the physical address (and using the cache index of the virtual address). If the tag of the cache entry thus addressed still does not correspond to the physical address, a cache miss is signaled.

11 Claims, 8 Drawing Sheets

CACHE MEMORY INDEXING USING VIRTUAL, PRIMARY AND SECONDARY COLOR INDEXES

BACKGROUND OF THE INVENTION

1. Field of the Invention

The invention refers to a cache memory with a virtually or physically indexed and physically tagged cache memory.

2. Description of Related Art

Modern processors require cache memories to bridge the gap between fast processors and slow main memories.

In direct mapped caches (see FIGS. 6 and 7), a map function is used for computing a cache index from the physical or virtual address a, thus selecting a line of the cache. Subsequently, a is compared with the address of the storage area currently associated with this cache line (the tag of the cache entry). Equality produces a hit (and the cache line is used instead of the main memory), otherwise we get a miss.

In most cases (a mod cache size)/line size is used as a map function. In this case, the complete virtual address need not be stored in the cache, but a/cache size is sufficient.

Direct mapped caches are simpler, but lead to higher miss rates than n-way set-associative caches do. These caches consist in principle of n direct mapped cache blocks which are accordingly smaller. Additionally, it is ensured that each main memory element is contained in at most one block. Since the map function indexes n cache lines each time, a maximum of n elements with map-equivalent addresses can be contained in the cache. This n-fold associativity reduces the probability of clashes and increases the hit rate correspondingly.

Physically and virtually indexed caches are well-known. In the case of the physically indexed cache (FIG. 6), the virtual address delivered by the processor is first translated into a physical address by the translation lookaside buffer (TLB). Subsequently, the cache is addressed using the physical address.

In the case of the virtually indexed cache (FIG. 7), the cache is addressed directly using the virtual address. A translation into the corresponding physical address is done only upon cache miss. The advantage of a virtually indexed cache is higher speed since the translation step to be done by the TLB is not necessary. Its disadvantages appear in the case of synonyms (aliasing) and/or multiprocessor systems.

Though a physically indexed cache does not show these disadvantages, it requires a complete address translation step (virtual→physical) from the TLB prior to initiating a cache access.

The cache type favored nowadays is virtually indexed and real physically) tagged. It is as fast as a virtually indexed and virtually tagged cache, but avoids most disadvantages of the latter, in particular problems with multiprocessor systems, synonyms, sharing and coherence.

A virtually indexed and physically tagged cache enables parallel execution of TLB and cache access (see FIG. 8). The instruction pipeline of the processor is therefore shorter so that the latency of an instruction is usually reduced by one cycle and the processor's performance is increased correspondingly.

The mechanism remains simple if all address bits (i) required for cache indexing are in the area of the address offsets (address within a page). Since this address part is not modified by translating the virtual address into the physical address, the cache can be addressed (indexed) even before the TLB translation step. Only at the end of a cache access and simultaneous TLB translation step, is it checked whether the physical address associated with the cache entry (the tag) matches the physical address delivered by the TLB. For this purpose, only the high-order bits of the address which are adjacent to the index part (i) need to be compared since the cache entry indexed by (i) can only be associated with addresses having index bits of value (i). Accordingly, only the high-order bits have to be stored in the cache as tag (physical address).

An n-way set-associative cache of this type can have a maximum size of $n \times 2^P$, where $2^P$ is the page size. Larger caches require larger pages or higher associativity.

However, a more interesting technique is page coloring. This is a method of creating pages in the physical memory in such a way that the low-order address bits of virtual and physical page addresses are identical (see FIG. 9). Virtual page number (vpn) and cache index (i) overlap in this case. In FIG. 9, the overlapping part is represented as a black box. The corresponding part of the virtual address is called virtual color c, that of the physical address is called physical color c'. Upon color-preserving allocation, i.e., if virtual color and physical color are identical, the above mentioned size limitation $n \times 2^P$ no longer holds.

If, as shown in FIG. 10, virtual and physical color are also compared, the color bits can be omitted when storing the tag (physical address) and only the high-order bits of the physical page number (r') have to be compared with the tag.

Of course, a cache should also work in the case of an allocation which is not perfectly well-colored. If the first cache access leads therefore to a miss and if the physical color c' delivered by the TLB is different from the virtual color c, a color-corrected cache access would have to be tried (see FIG. 11). Pages colored incorrectly can therefore be used, for accessing data in such a page, however, always an additional step upon cache access would be required (see FIG. 12).

It is to be noted that badly-colored allocations cannot be avoided under certain conditions, e.g. if two virtual pages of different colors have to be mapped to the same physical page. This involves repeated color corrections, which is time-consuming and delays the cache access.

It is the object of the invention to build a cache that is virtually and/or physically indexed and physically tagged, and, even in case of badly-colored allocated pages, allows for a fast cache access and/or reduces the risk of clashes.

SUMMARY OF THE INVENTION

In order to solve this object a memory device with the features of claim 1 is provided; features of advantageous embodiments are mentioned in the respective subclaims. In the present memory device, a secondary group information ("secondary color") is associated to each physical address translated from a virtual address, apart from a primary group information (referred to above as "physical color"). Both information elements are derived from the page tables, in particular by the MMU Memory Management Unit), and are written into the translation lookaside buffer (TLB), if any should be used. If no tag of the addressed cache entry or entries matches the physical address translated from the virtual address and the group information ("virtual color") of the virtual address does not match the secondary group information (secondary color) associated to the translated physical address, color correction is executed by indexing the cache memory again using the cache index portion and the secondary group information and by comparing the tag or tags of the addressed cache entry or entries with the physical address translated from the virtual address.

In the present memory device, a cache access using a virtual address is attempted as follows:

a) First, a number of cache entries is addressed corresponding to the associativity of the cache memory, by indexing the cache memory using the cache index and the group information which are both part of the virtual address aor which are derived from the virtual address or from parts thereof (FIG. 2).

Subsequently, the virtual address or, more specifically, its page number address portion representing the virtual page number, is translated into a physical address or, more specifically, a page number physical address portion representing the physical page number. This page number physical address portion includes the primary group information as one part thereof. Upon translation, the associated secondary group information is also provided.

b) The physical address resulting from the translation of the virtual address is compared with the tag of each addressed cache entry.

The translation of the virtual address into the physical address is normally done with a translation lookaside buffer (TLB) indexed by a part of the virtual address—possibly modified by a hash function—so as to compare the part of the virtual address used for indexing with the tag of the addressed TLB entry. In case of a match, the physical address and the first and second group information are read from the TLB entry. If they differ, there is a TLB miss and the translation of the virtual address into a physical address is executed by the MMU using page tables, for example (FIG. 1).

c) Upon a match of the translated physical address and the tag of the addressed cache entry or one of the tags of the addressed cache entries, there is a cache hit and reading from the data field of the respective cache entry, or writing into the data field, takes place, depending on well-known status information and access control variables not detailed herein.

d) Otherwise, the cache memory is indexed again, using the cache index of the virtual address and the secondary group information. It is suitable to perform this new indexing of the cache memory only if the virtual group information does not match the secondary group information associated to the physical address. For the cache entry or entries thus addressed, the steps b) and c) are repeated (FIG. 4).

e) If, after a new indexing operation, there still is no match between the physical address and the tag or one of the tags, a cache miss is indicated and the access is aborted.

The invention allows for a better exploitation of main memories with large cache memories without the cache access times being increased. This is due to the fact that no longer only well-colored, but also other defined not well-colored allocations can be treated efficiently (via the secondary group information). The secondary group information is of the present memory device is a random information, yet defined prior to the indexing of the cache memory, which information is provided in particular by the TLB and/or the MMU which obtains or derives the secondary group information from the page tables.

In case of inequality between the tag of the cache entry or entries addressed with the cache index portion and the group information, according to a modification of the above access (see claim 4), an access by indexing the cache memory using the secondary group information and the cache index portion of the virtual address will only be attempted if the secondary group information differs from the group information. In any other case, the cache access is aborted and a cache miss is signaled. For the required comparison of the secondary group information with the group information, a group information comparison is provided.

In an alternative embodiment of the invention, after an access that resulted in a cache miss, the cache memory is indexed anew with the primary group information (and the cache index portion). This indexing nay be executed either directly after the first indexing using the group information of the virtual address or after the indexing using the secondary information.

Preferably, after the first indexing using the group information (and which did not result in a cache hit) and prior to the new indexing with the primary or secondary group information, it is checked whether the secondary group information differs from the group information or whether it is identic with the group information. Should the secondary group information differ from the group information, the first new indexing (second indexing) is executed using the secondary group information. If this second indexing did again not lead to a cache hit, a third indexing will be attempted thereafter, using the primary group information (normal case). Should, however, the primary group information differ from the secondary group information, while the secondary group information and the group information are identical, the indexing operation using the secondary group information, which in fact had been attempted before with the first indexing and had not been successful (group information and secondary group information are identical), is skipped and the new indexing operation of the cache memory (also referred as the third indexing in analogy to the above) is executed using the primary group information (special case). In the two cases described above, the third indexing using the primary group information is preferably executed only if the primary group information differs from both the group information and the secondary group information.

Alternatively, the second indexing is always attempted using the primary group information, so as to attempt the third indexing with the secondary group information should there have been no cache hit. It is also possible upon the first new indexing to select one of the two possibilities, in particular under control by a random-check generator, i.e. to select either the second indexing using the secondary group information and the third indexing using the primary group information or the second indexing using the primary group information and the third indexing using the secondary group information. Instead of a random-check generator, or in addition to the same, the choice of the two possibilities mentioned above can be made considering previous hits (cache hit) or misses (cache miss).

For a better exploitation of the space of a cache memory, an alternative embodiment of the invention provides that the cache memory is indexed by a combination of the cache index portion of the (physical or virtual) address and an additional index, the additional index being associated to the address while not being a part thereof. Choosing the additional index correspondingly, the indexing of the cache memory can be purposefully influenced, which offers a chance for an improved exploitation of the memory space. The additional index is provided, e.g., by a MMU and/or a TLB,-which also provide the physical address or the portion of the address necessary for accessing the cache memory.

The appended claims 12 to 15 refer to variants of a cache memory array with a first- and second-level cache memory device of the above mentioned kinds according to the present invention.

BRIEF DESCRIPTION OF THE DRAWINGS

The following is a detailed description of an embodiment of the invention. In the Figures

DESCRIPTION OF THE PREFERRED EMBODIMENT

Figure 1:
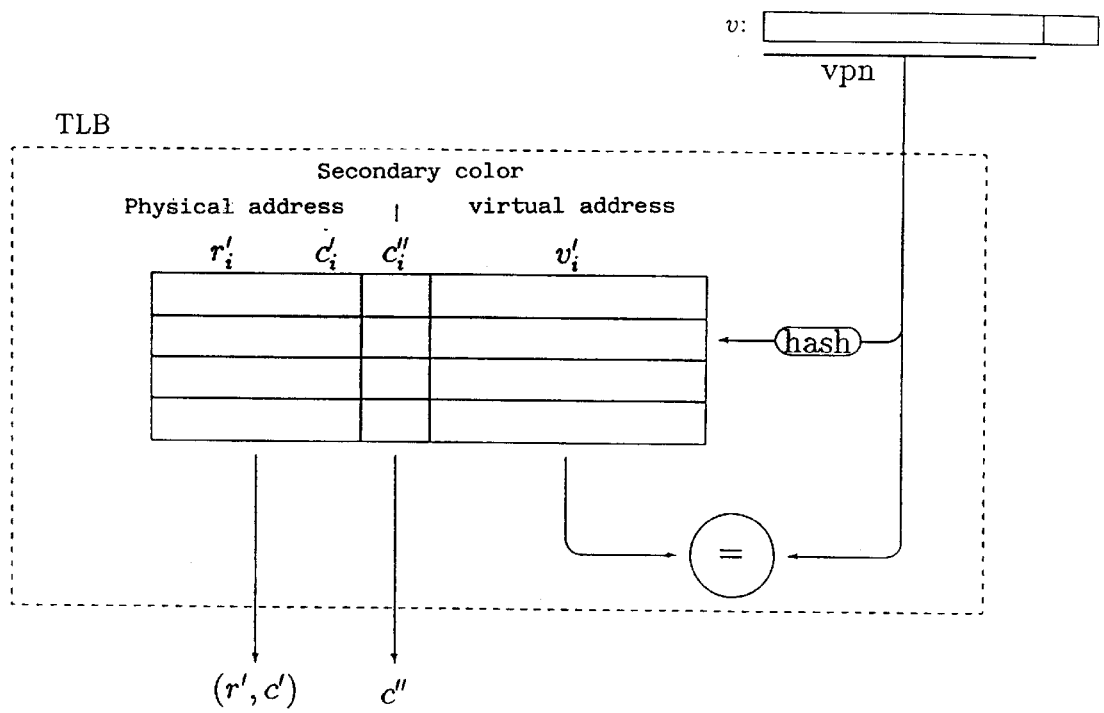
FIG. 1 is a schematic illustration of the structure of a TLB as used in the cache memory.

The secondary color TLB, used for translating the virtual address into the physical address, differs from conventional TLBs in that it not only contains virtual page number, physical page number and possibly status control information (not listed here) and access control information (access attributes) per entry but in addition one secondary color per virtual page (see also FIG. 1). Upon a hit, the TLB delivers the physical address (r',c) and the corresponding secondary color (c").

It is irrelevant, whether the TLB is direct mapped, n-way set-associative or fully associative. In the case of an n-way set-associative TLB, n entries are selected simultaneously and their virtual addresses are compared with vpn in parallel. In the case of a fully associative TLB, the hash and selection function is not used, and all TLB entries are simultaneously checked against vpn.

Independently of the used page table structure, a TLB entry is reloaded from the page table data structure upon a TLB miss. In this case, not only physical address and access attribute but also the secondary color are taken from the page table (i.e., at least each valid lowest level page table entry also contains the selected secondary color).

The secondary color can be selected freely by the operating system, in particular in such a way that the above invariance condition always holds. The following statement holds: if two TLB entries refer to the same physical page address, their secondary colors match (invariance condition).

The basic idea is to use always the secondary and not the primary (physical) color for allocation in the direct mapped or n-way set-associative cache. Accesses via virtual addresses which match with the secondary color are then fast; other ones need an additional color correction step (in the case of c'=c", the system behaves like a conventional cache).

Notation (see also FIG. 2):

v virtual address vpn virtual page number c virtual color (group information of the virtual address)

rpn physical (real) page number c' physical color, also referred to as primary color (primary group information)

c" secondary color (secondary group information)

r' high-order part of rpn (without c')

$\ddot{c}$ index color (the portion that is used for indexing the cache besides the index portion of the virtual address)

$\ddot{i}$ low-order part of cache entry number

Each cache entry (line) contains a field $r_i$ and a field $c_i$ for the tag, a data field $d_i$, as well as further status fields which are not listed here.

A current cache line is selected by an index i whose high-order bits are referred to as index color $\ddot{c}$. Virtual color, primary color, secondary color and index color have the same number of bits.

Step 1

Figure 2:
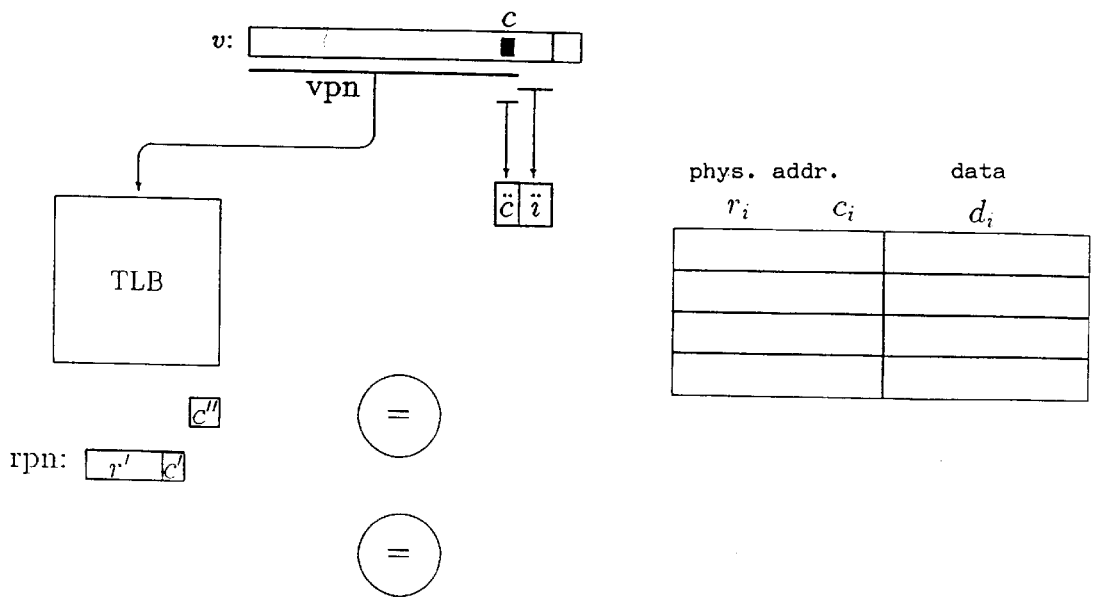
FIG. 2 shows the step of preparing the indexing of the cache memory.

At the beginning of a cache access, the index port ($\ddot{c}$, $\ddot{i}$) is loaded from the virtual address (see FIG. 2). Simultaneously, the TLB starts an address translation with vpn as input.

Step 2

Figure 3:
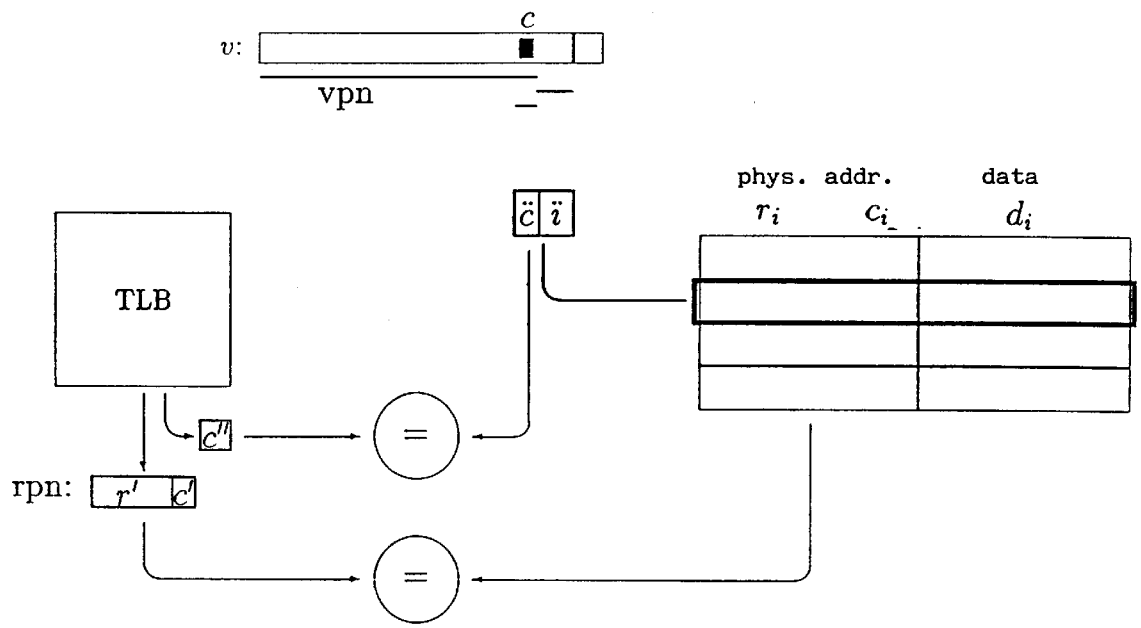
FIG. 3 illustrates the first access step at the cache memory.

The cache entry addressed through ($\ddot{c}$, $\ddot{i}$) is read out. The physical page address (r', c') delivered by the TLB is compared with the physical address ($r_i$, $c_i$) stored in the cache entry and the secondary color c" also delivered by the TLB is compared with the index color $\ddot{c}$ (FIG. 3). If the physical addresses are identical ((r',c')=($r_i c_i$)), it is a cache hit, i.e., the data of the cache are delivered (read access) or the new data are written into the cache (write access). Then cache access is finished. If the cache memory is n-way set-associative, the physical address delivered by the TLB is compared in parallel with the physical addresses contained in the n selected entries simultaneously. A cache hit is obtained if one comparison delivers a match. The corresponding entry is read out or modified, depending on access attributes and status information.

Step 3

Figure 4:
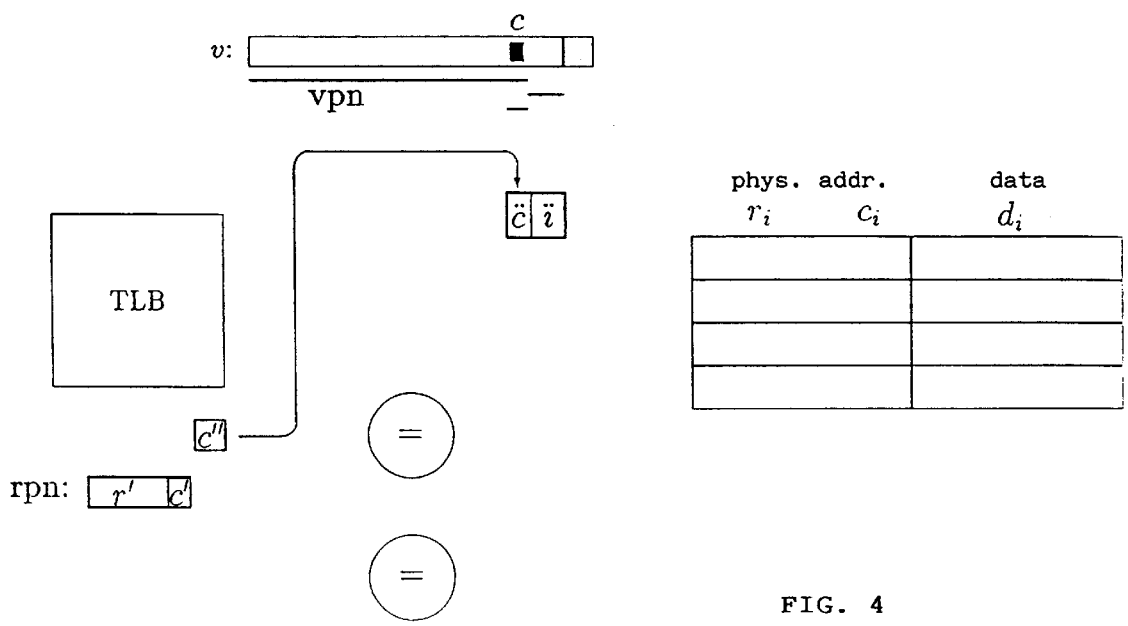
FIG. 4 shows the color correction step at the cache memory.

If step 2 did not yield any cache hit (in all cases (r', c')≠(r $_i c_i$)) and if the index color differs from the secondary color ($\ddot{c}$≠c"), a color correction is tried (FIG. 4): $\ddot{c}$ is loaded with secondary color c" and step 2 is executed again.

Step 4

In any other case, cache access is aborted and a miss is signaled.

For reasons of clarity, only reading out and writing whole cache entries have been described. Considering low-order address bits, only parts of an entry can of course also be read or written using the usual and well-known procedures. There are no impacts on the control logic described here.

Free allocation of cache entries by means of primary or secondary color (mixed even within one page) is enabled by modifying steps 2 and 3. The procedure is as follows:

Step 2

The cache entry addressed through $(\ddot{c}, \ddot{i})$ is read out. The physical page address (r', c') delivered by the TLB is compared with the physical address $(r_p, c_i)$ stored in the cache entry, the primary color c' is compared with the index color $\ddot{c}$ and the secondary color c", also delivered by the TLB, is compared as well with the index color $\ddot{c}$. If the physical addresses are identical $((r', c')=(r_p c_i))$, it is a cache hit, i.e., the data of the cache is delivered (read access) or the new data is written into the cache (write access). Then the cache access is finished.

Step 3

If step 2 did not yield any cache hit (in all cases $((r', c')\neq(r_i, c_i))$ and if there was not yet a detour step during this cache access and (a) if the index color is identical to the secondary color ($\ddot{c}=c$") and if primary and secondary color are different (c'≠c"), a detour is attempted: $\ddot{c}$ is loaded with the primary color c', a detour step is recorded and another step 2 is executed;

(b) or if the index color differs from the secondary color ($\ddot{c}\neq c$"), a color correction is attempted (FIG. 4): $\ddot{c}$ is loaded with the secondary color c" and another step 2 is executed.

Variant 1

Primary color and secondary color exchange their roles:

Step 3

If step 2 did not yield any cache hit (in all cases ((r', c') ; $(r_p c_i)$) and if there was not yet a detour step during this cache access and (a) if the index color is identical to the primary color ($\ddot{c}=c'$) and if primary and secondary color are different (c'≠c"), a detour is attempted: $\ddot{c}$ is loaded with the secondary color c", a detour step is recorded; or (b) if the index color differs from the primary color ($\ddot{c}\neq c'$), a color correction is attempted: $\ddot{c}$ is loaded with the primary color c' and another step 2 is executed.

Variant 2

If the virtual color equals neither the primary nor the secondary color, one casts dice for determining the sequence of trying c' and c":

Step 3

If step 2 did not yield any cache hit (in all cases $((r', c')\neq(r_p, c_i))$ and if there was not yet a detour step during this cache access and (a) if the index color is identical to the primary color ($\ddot{c}=c'$) and if primary and secondary color are different (c'≠c"), a detour is attempted: $\ddot{c}$ is loaded with the secondary color c", a detour step is recorded and another stop 2 is executed; or (b) if the index color is identical to the secondary color ($\ddot{c}=c'$) and if primary and secondary color are different (c'≠c"), a detour is attempted: $\ddot{c}$ is loaded with the primary color c', a detour step is recorded and another step 2 is executed; or (c) if the index color is different from primary and secondary color ($\ddot{c}\neq c'$ and $\ddot{c}\neq c$"), a color correction is attempted by loading $\ddot{c}$ with the primary color c' or with the secondary color c" and another step 2 is executed.

The decision mechanism of item 3c can work randomly or consider preceding hits and misses. A further variant is that, in addition to the secondary color, the TLB also stores a strategy hint which is analyzed by the decision mechanism.

Figure 5:
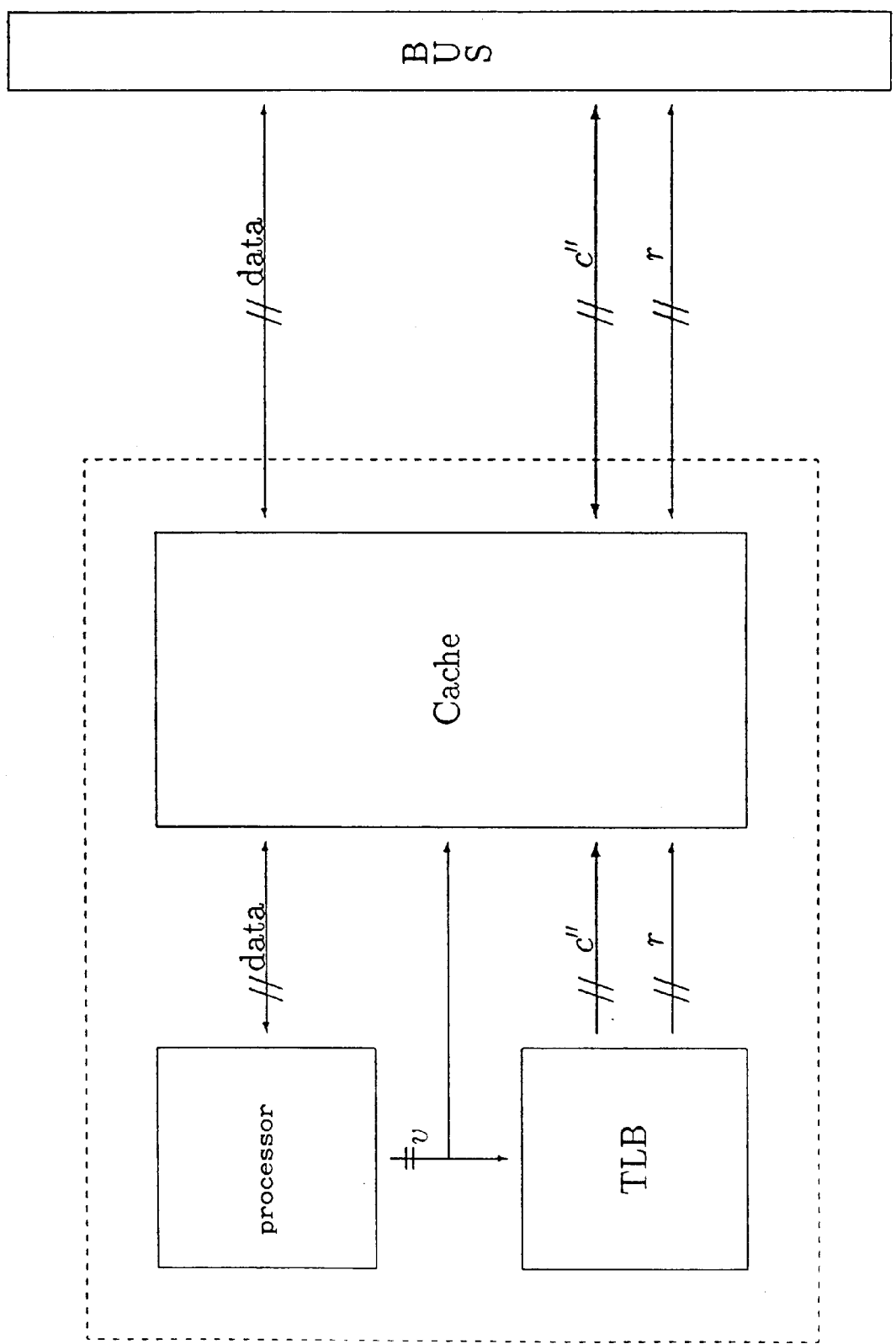
FIG. 5 illustrates a block diagram of a secondary color cache with a secondary color bus for connecting a plurality of secondary color cache memories.
Figure 6:
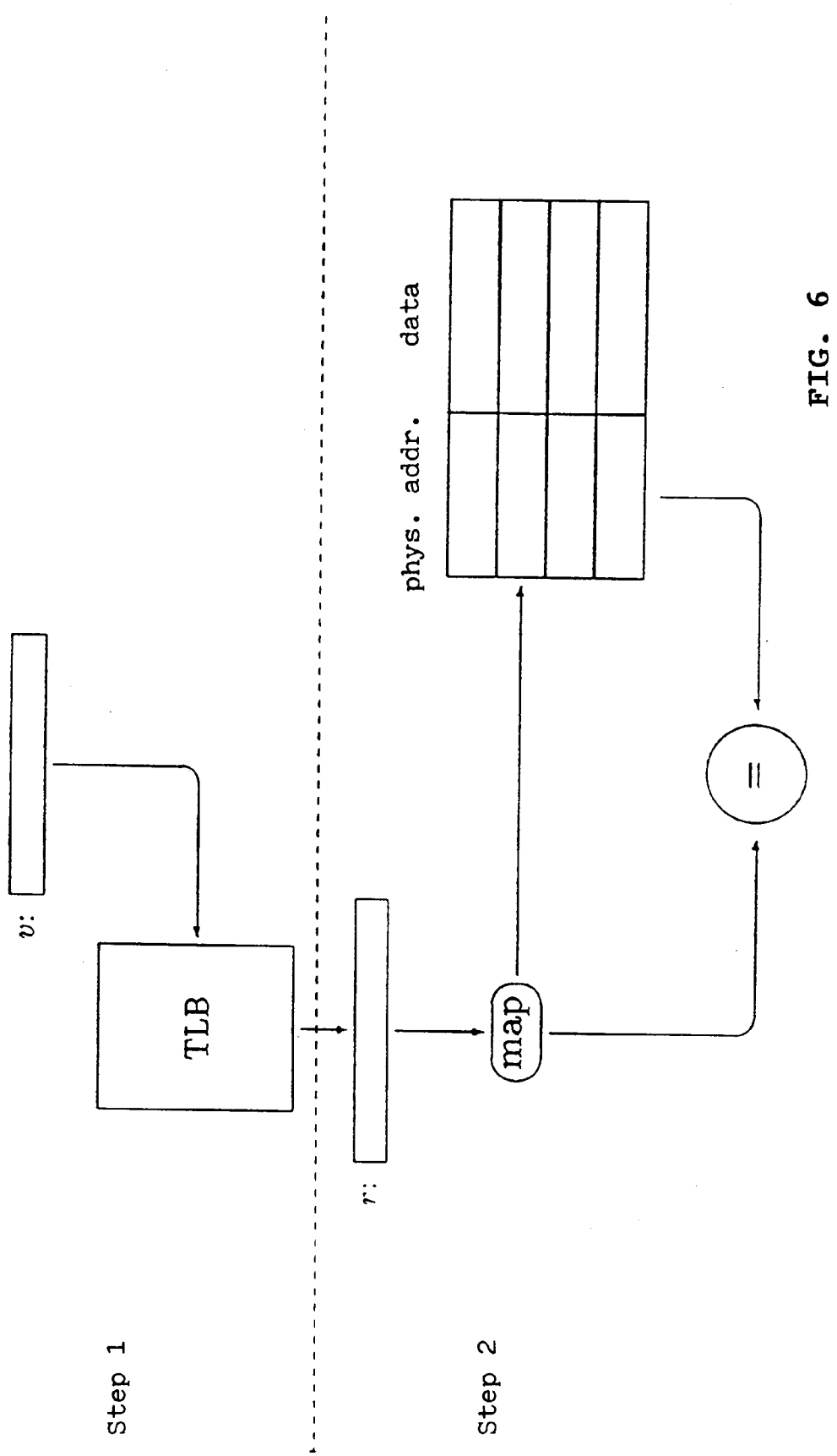
FIG. 6 shows the structure of a physically indexed cache memory.
Figure 7:
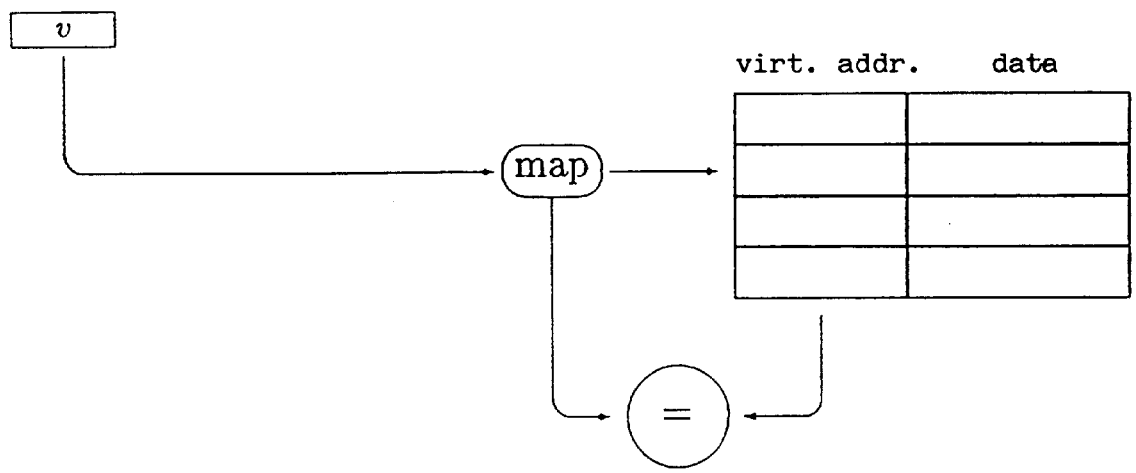
FIG. 7 illustrates the structure of a virtually indexed and virtually tagged cache memory.
Figure 8:
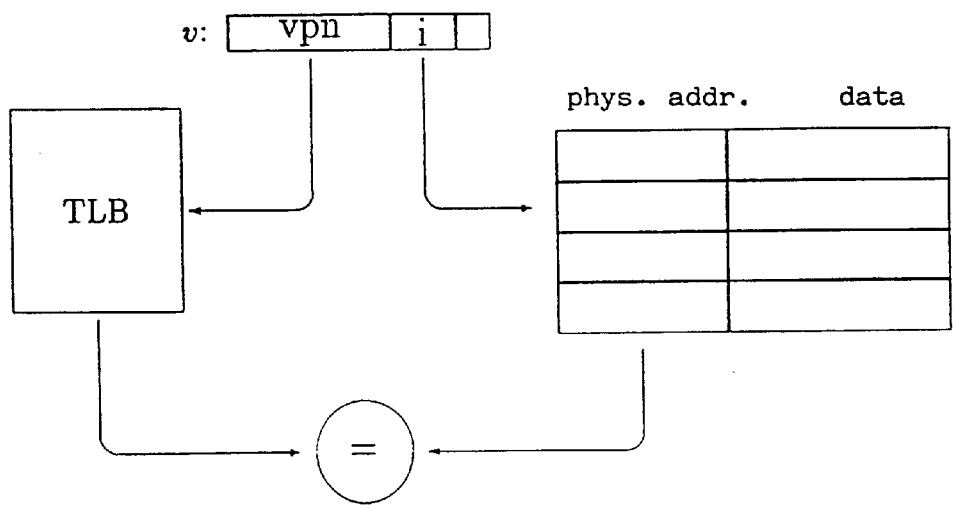
FIG. 8 shows the structure of a virtually indexed and physically tagged cache memory.
Figure 9:
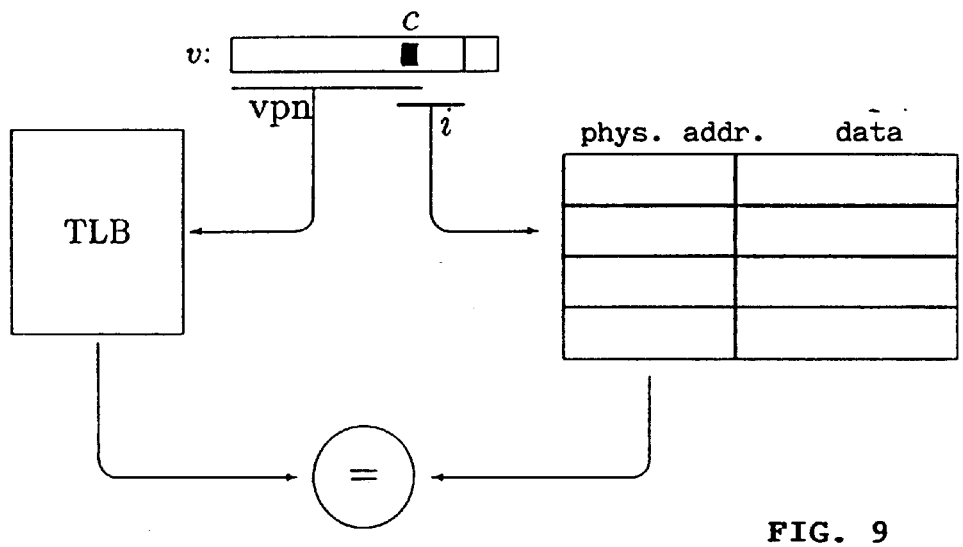
FIG. 9 illustrates the structure of a cache memory based on well-colored allocation.
Figure 10:
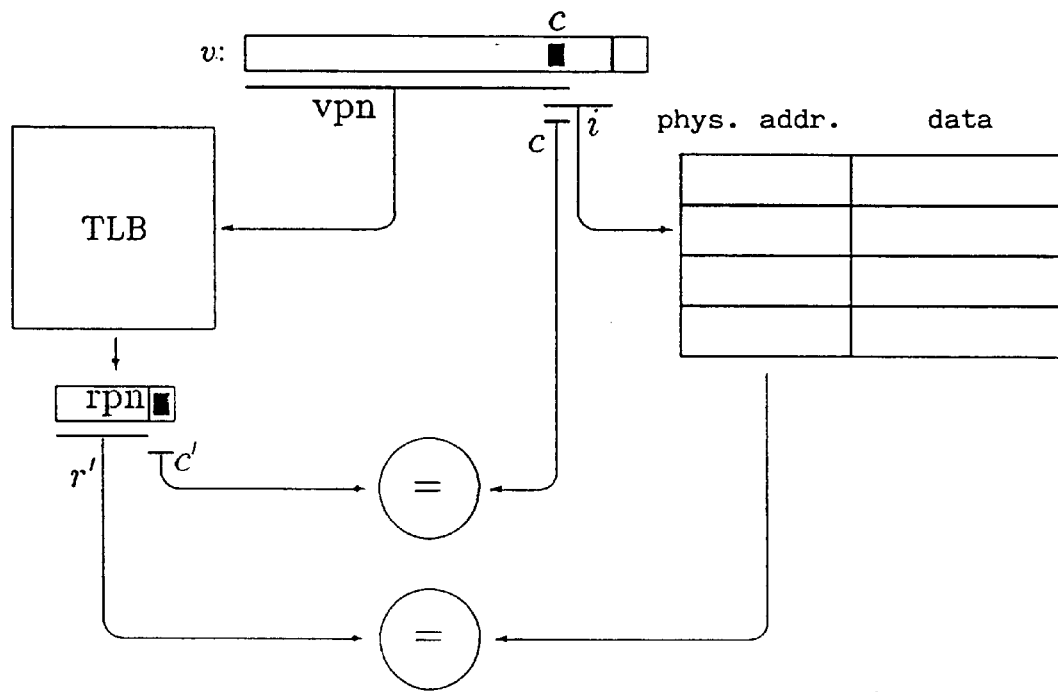
FIG. 10 shows the step of checking the well-coloring in the cache memory of FIG. 9.
Figure 11:
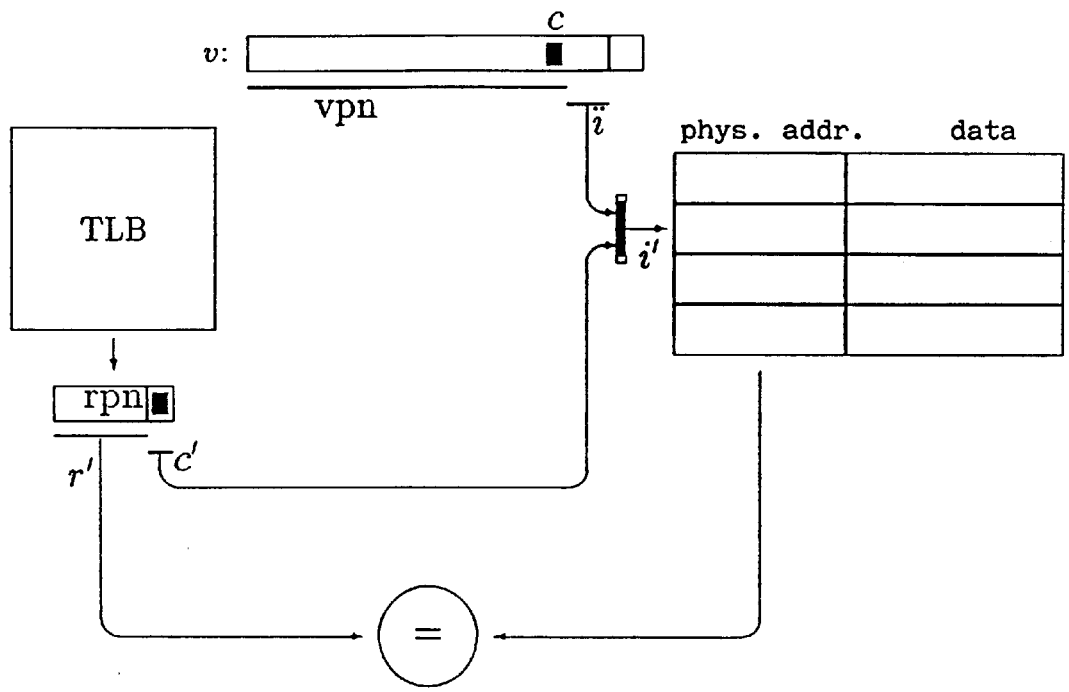
FIG. 11 illustrates the color correction step in the cache memory of FIG. 9.
Figure 12:
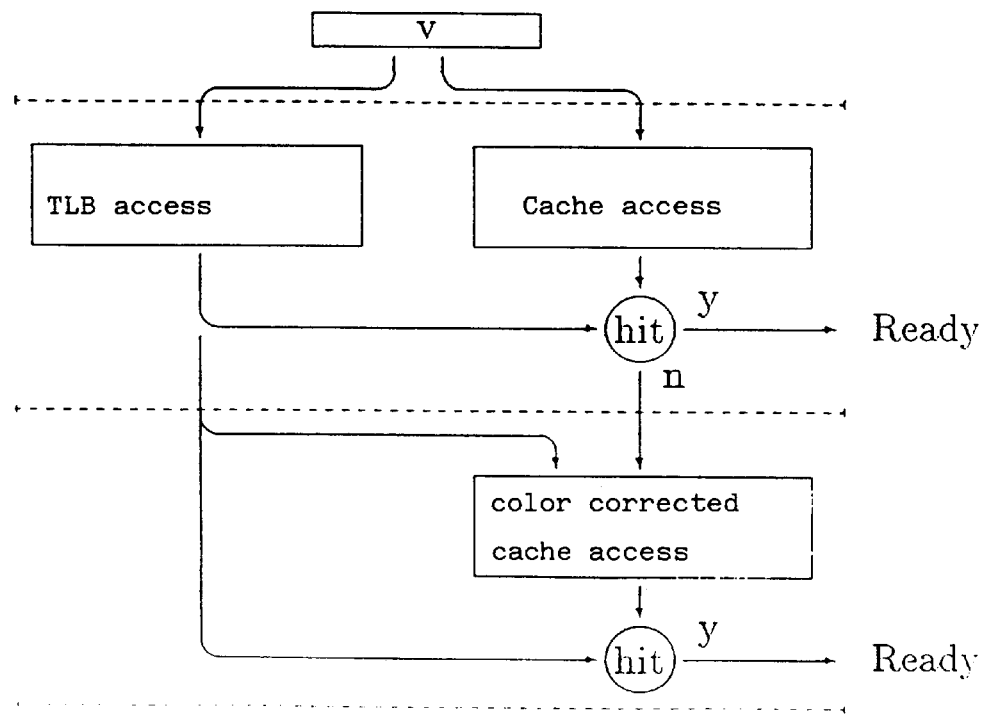
FIG. 12 illustrates the access step in the cache memory of FIG. 9

For multiprocessor systems with a plurality of processors and caches directly associated therewith it holds that almost all cache coherence protocols require that not only the processor but also the memory bus delivers the secondary color in addition to the physical address (FIG. 5). For implementation, the external address bus is extended by a secondary color bus. If the latter is used consistently, each coherence protocol working on conventional physically addressed caches can be implemented without extra effort.

The cache of each processor places not only the physical address but also the secondary color onto the bus. That is always possible because the secondary color is delivered by the TLB upon read accesses and can be extracted from the cache index upon write accesses.

For multiprocessor systems, the problem is therefore solved if the page table trees of all processors contain no inconsistent secondary color allocations, i.e., if the invariance condition mentioned above holds system-wide.

For reasons of consistency, bus masters which do not access via virtual addresses, for example DMA or screen processors, should also support the secondary color bus.

To take the physical color as a secondary color and to leave the solution of the consistency problem to the operating system is the simplest solution. The latter must then allocate such areas appropriately (secondary color =physical color) or otherwise it must flush the caches before.

Such restrictions can be avoided by providing the corresponding controllers with secondary color information. When programming a DMA chip, one would program not only address and length per storage area, but also the secondary color.

Upon MMU accesses to the page tables, the TLB can deliver no secondary color information. However, such accesses can be executed using the physical color as secondary color.

It is also possible to use a specific secondary color for this purpose or to read out the secondary color information together with the table addresses for the next step from the page table entries when parsing the tree. In this way, the allocation of cache entries for page table information can possibly be controlled.

If the restriction that the secondary color of a physical area is identical for all accessing processors, should be removed, a set of secondary colors can be stored in each page table entry instead of one single color. Each processor is extended by a register which indicates which entry of the secondary color set is applicable to the respective processor. (Consequently, the secondary color set can be by far smaller than the number of the processors.)

The secondary color bus is then extended such that it provides a whole set of secondary colors. However, for write back caches, the secondary color set must be stored in the cache. For write through caches, it suffices if the TLB stores the respective set.

An alternative, but very costly method which is difficult to scale uses an RTB or a second MMU (with TLB) which derive the respective secondary color from the physical address.

Figure 13:
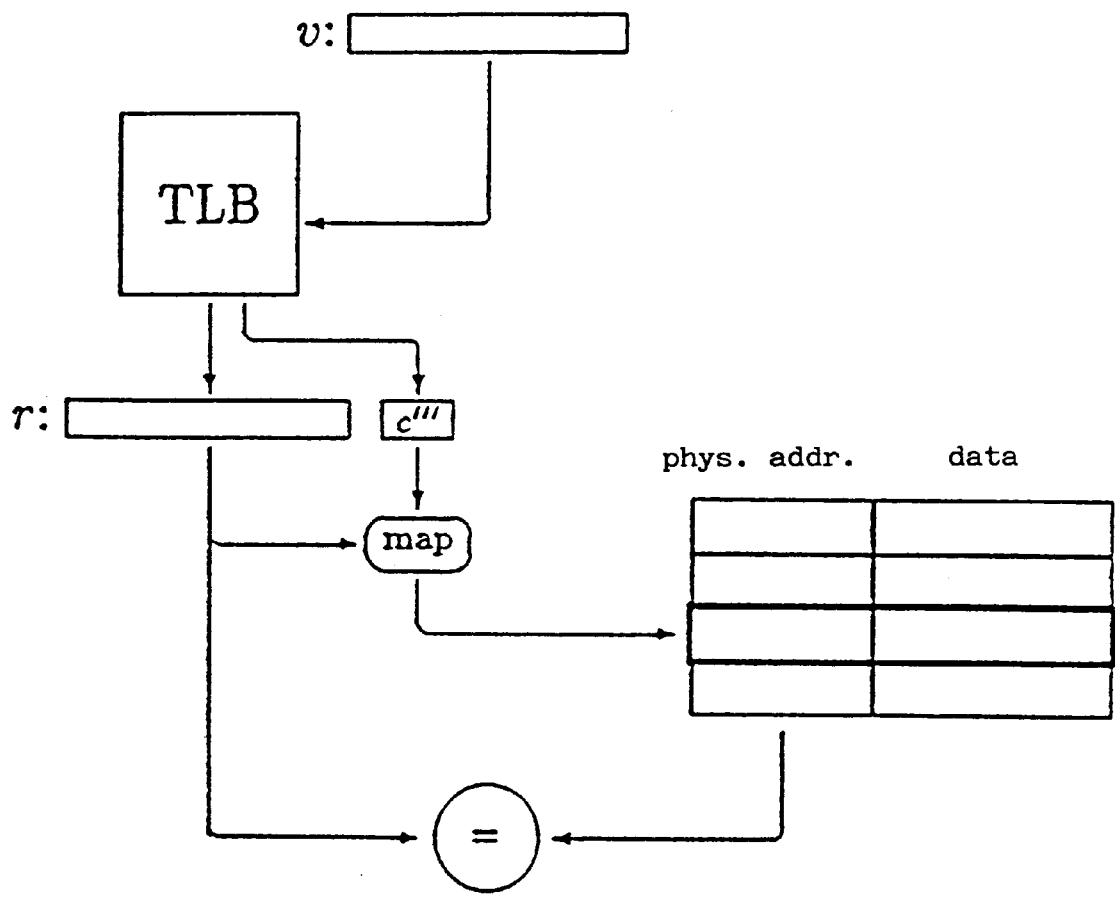
FIG. 13 shows a physically indexed cache with an additional index associated with the address.

Referring to FIG. 13, a further embodiment of a cache memory will be explained, which in this case is a physically indexed cache memory.

The idea of controlling the cache allocation not only via the address, but also via a bit of information contained in the page table entries in addition to the physical address, may also be implemented for physically indexed caches. It is true that this does not speed up the individual cache access in case of a hit, but it allows for a better exploitation and a higher hit rate because of a reduction of clashes. This variant is particularly interesting in the context of second level caches.

The additional index c''' used for indexing besides the address r, may be referred to as the tertiary color according to the terminology used above. The tertiary color can (but does not have to) be a wider bit field than the above mentioned secondary color. It can also be identical with the secondary color or contain the same as a part thereof (of course, the entire scheme also works exclusively with the tertiary color, i.e. without the secondary color).

The MMU or the TLB supplies the physical address r and the tertiary color c''' (see FIG. 13). In the map function, the tertiary color c''' is logically linked (combined) with the cache index portion of the physical address r used for the cache indexing. Simple logic linkages are, for example:

1. Replacing a portion of r with c'''.
2. Exclusive-ORing a portion of r with c'''.
3. Adding a portion of r and c'''.

What is claimed is:

1. A method of addressing a cache memory device for storing data, comprising a one-way or multi-way set-associative cache memory that is indexed by predetermined bits of a multi-bit virtual address (v) comprising a cache index portion (i') for addressing one of a plurality of cache entries of the cache memory, which each comprises at least one tag ($r_i$, $c_i$) and at least one data field (d'), and a page number address portion (vpn) representing a virtual page number, which includes group information (c) specifying one of a plurality of groups to which the virtual page represented by the page number address portion (vpn) of the virtual address (v) belongs, the virtual address (v) being translatable into a multi-bit physical address to which primary and secondary group information (c', c") are associated, the cache memory comprising at least one tag comparator for comparing the tag or predetermined bits of the tag of a cache entry, indexed by means of the cache index portion (i') and the group information of the virtual address (v) or the primary or secondary group information, with predetermined bits (r', c') of a physical address translated from the virtual address, wherein cache addressing is attempted with the following steps:

a) the cache memory is indexed using the cache index portion (i') and the group information (c) of the virtual address (v), one cache entry being addressed per way of the cache memory, b) in the associated tag comparators, the tags ($r_i$, $c_i$), or their predetermined bits, of all cache entries thus addressed are compared to the predetermined bits (r', c') of the physical address translated from the virtual address (v), c) if there is a tag ($r_i$, $c_i$) matching predetermined bits (r', c') of the physical address, there is a cache hit and the cache address operation is terminated, it being possible for data to be written into and read out from the data field (d) specified by this tag, d) if, in step b), there is no match, the cache memory is indexed using the cache index portion (i') of the virtual address (v) and the secondary group information (c") and the steps b) and c) are executed for the cache entry or entries thus addressed, e) if again no match is obtained in step b), a cache miss is given and the cache address operation is terminated.

2. The method of claim 1, characterized in that a translation lookaside buffer (TLB) unit of a memory management unit (MMU) is provided for the translation of a virtual address into a physical address, which, in addition to the physical address or parts of the physical address, also provides the primary and secondary group information (c', c") associated thereto.

3. The method of claim 2, characterized in that upon a cache miss, also the primary and secondary group information (c', c") for the physical addresses stored in the TLB unit are determined using page tables.

4. The method of claim 1, characterized in that step d) is executed only if the secondary group information differs from the group information.

5. The method of claim 1, characterized in that, following step b) which is executed for the first time or according to step d), the following steps are performed:

e) if, in step b), there is no match, the cache memory is indexed using the cache index portion (i') of the virtual address (v) and the primary group information (c') of the physical address translated from the virtual address (v), and the steps b) and c) are executed for the cache entry or entries thus addressed, and f) if again no match is obtained in step b), a cache miss is given and the cache address operation is terminated.

6. The method of claim 5, characterized in that step e) is executed only if the primary group information differs from both the group information and the secondary information.

7. The method of claim 5, characterized in that after the first execution of step c), step e) is executed first, followed by step d).

8. The cache memory device of claim 5, characterized in that a decision device is provided, by means of which it is decided whether, following the first execution of step c), step e) is to be executed first, followed by step d), or whether step d) is to be executed first, followed by step e).

9. The method of claim 8, characterized in that the decision device comprises a random-check generator.

10. The method of claim 8, characterized in that the decision device takes previous cache hits into consideration for the current virtual address and makes the decision in dependence thereon.

11. The method of claim 1, characterized in that in a multi-processor system with a bus and at least one cache memory, the bus also transmits the primary and/or the secondary group information, besides data and physical addresses.

* * * * *